(No Model.)

E. SQUIRES.
Plow.

No. 240,558.        Patented April 26, 1881.

Witnesses:
Chs. W. Donn
L. C. Donn

Inventor:
Edward Squires
By J. N. Kaeb
Atty.

N. PETERS, PHOTO-LITHOGRAPHER, WASHINGTON, D. C.

UNITED STATES PATENT OFFICE.

EDWARD SQUIRES, OF BEAVERTON, OREGON.

PLOW.

SPECIFICATION forming part of Letters Patent No. 240,558, dated April 26, 1881.

Application filed July 31, 1880. (No model.)

*To all whom it may concern:*

Be it known that I, EDWARD SQUIRES, a citizen of the United States, residing at Beaverton, in the county of Washington and State of Oregon, have invented certain new and useful Improvements in Agricultural Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to plows, and peculiarly to that class in which the beam is adjustable with reference to the plow proper, whether it is mold-board, shovel, or subsoil.

The object of the invention is to furnish a readily-adjustable plow, which may be changed for various forms of work and easily adjusted as to the pitch of the beam and the position of the various parts.

The invention will be understood from the following specification and claim.

The plow may be adapted for use as a bar-share, as a shovel, or as a subsoiler, and when the bar-share is used a subsoiler may be attached to the landside.

Figure 1:
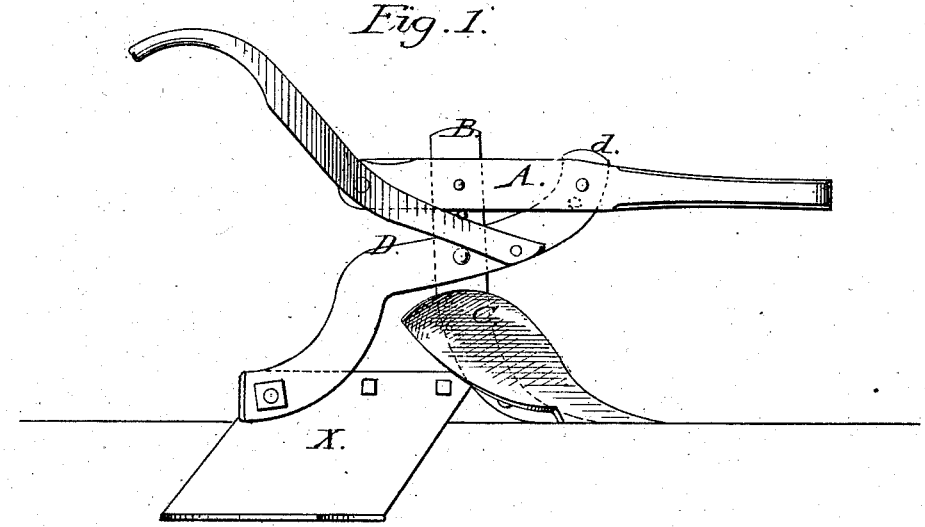
Figure 2:
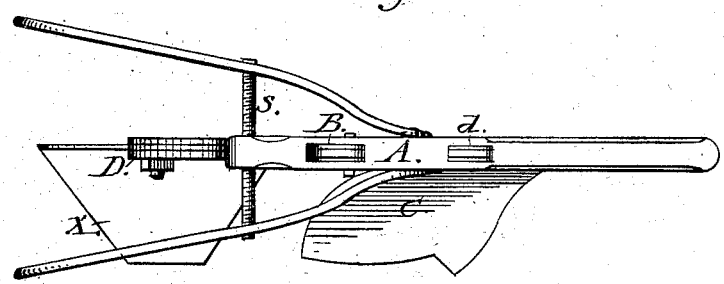
Figure 3:
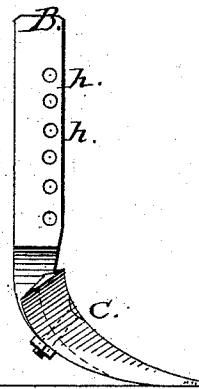

In the accompanying drawings, Figure 1 is a view showing the mold-board form with subsoiler attached. Fig. 2 is a top view, showing the mortises in the beam and the threaded cross-bar. Both Figs. 1 and 2 show the plow adapted for use as a bar-share, and having a supplemental subsoiler attached to the landside. Fig. 3 shows the form of standard adapted to receive a shovel.

A is the beam, to which the plow is applied.

B is the post, passing through a mortise in the beam. It is provided almost its entire length with a line of holes, $h$, which render it vertically adjustable.

C is the plow proper, whether mold-board, subsoiler, or shovel, attached to the lower end of the post B.

D is the brace, which is of suitable curved form to meet the beam, the post, and the rear end of the landside of the plow. It is pivoted or bolted to the beam at $d$. It may have several holes to make it adjustable at this point. Near its center it is broadened and mortised out, so as to encompass the post B, which moves freely through it. Here it is provided with a hole, through which it is held to the post by a pin. At the lower rear end it is bolted to the rear end of the landside.

The handles H are attached to the brace between the post and the beam above. At the rear end of the beam a screw-rod, S, passes from handle to handle, to which it is securely attached, through a threaded hole in the end of the beam. When the brace is made adjustable in the beam and moves therein, the threaded bar turns in the threaded hole in the end of the beam very easily; but when the ends of the handles are undisturbed the screw effectually prevents lateral movement of the handles, which would inevitably be the consequence in a smooth bar capable of turning in the end of the beam.

From this description it will be readily understood how the parts may be manipulated. The beam is either raised or lowered by moving the pins which pass through the beam and post or brace and post. This, of course, changes the set of the point, and will cause deep or shallow plowing, as may be desired. A slightly different effect may be produced by making the brace itself adjustable in the beam, which is readily done by punching several holes in it at different heights.

It is also readily apparent how the changes can be made from bar-share to shovel, to hilling-up shovel, or to subsoil, with no delay of consequence, as it will be seen that by removing the two pins the post is ready to come out and a new one is as readily inserted. In making the change from shovel to subsoil or hilling-up shovel, it may be done by simply removing the plow proper or shovel from the post and substituting another therefor, as is usually done in making changes of shoes on ordinary shovel-plows.

By means of the brace D and the adjustable standard B the pitch of the beam A is easily manipulated, and the handles H readily adapt themselves to the position of the other parts. The whole structure is thereby rendered peculiarly easy of adjustment.

X is the supplemental subsoiler, which is attached to the landside or to the brace by means of bolts. The front edge of this is sloped backward from the point of forward attachment to the landside. This supplemental subsoiler preferably consists of a piece of flat metal bent at right angles to itself, as shown.

Having thus described my invention, I desire to claim—

In a combination plow adapted to be changed for various kinds of work, the vertically-adjustable standard B and plow-beam A, in combination with the brace D, bolted adjustably to the standard, and the handles H, bolted to said brace and pivoted to the plow-beam, whereby the adjustment of the standard regulates the pitch of the beam and the relative position of the various parts, substantially as shown and described.

In testimony whereof I affix my signature in presence of two witnesses.

EDWARD SQUIRES.

Witnesses:
A. H. DANKS,
A. C. HAMILTON.